United States Patent [19]

Lin et al.

[11] Patent Number: 5,350,446
[45] Date of Patent: Sep. 27, 1994

[54] HOT MELT IMPULSE INK JET INK WITH DISPERSED SOLID PIGMENT IN A HOT MELT VEHICLE

[75] Inventors: An-Chung R. Lin, New Town; Theodore M. Cooke, Danbury, both of Conn.

[73] Assignee: Dataproducts Corporation, Woodland Hills, Calif.

[21] Appl. No.: 110,481

[22] Filed: Aug. 20, 1993

Related U.S. Application Data

[60] Continuation of Ser. No. 902,570, Jun. 22, 1992, abandoned, which is a continuation of Ser. No. 817,948, Jan. 3, 1992, abandoned, which is a continuation of Ser. No. 519,279, May 4, 1990, abandoned, which is a division of Ser. No. 146,211, Jan. 20, 1988, abandoned, which is a continuation of Ser. No. 6,727, Jan. 23, 1987, abandoned, which is a continuation of Ser. No. 668,095, Nov. 5, 1984, abandoned.

[51] Int. Cl.$^5$ .................... C09D 11/02; C09D 11/12
[52] U.S. Cl. ................. 706/27 R; 106/20 R; 106/20 D; 106/31 R; 347/88
[58] Field of Search ............... 106/27 R, 31 R, 23 A, 106/20 R, 20 D; 346/1.1

[56] References Cited

U.S. PATENT DOCUMENTS

| | | | |
|---|---|---|---|
| 2,426,248 | 8/1947 | Sugarman | 106/22 |
| 3,282,709 | 11/1966 | Ehrhardt et al. | 106/31 |
| 3,282,853 | 11/1966 | Bennett | 252/172 |
| 3,330,673 | 7/1967 | Voet et al. | 106/32 |
| 3,353,974 | 11/1967 | Trimble et al. | 106/31 |
| 3,382,088 | 6/1968 | Noda | 106/27 |
| 3,421,910 | 1/1969 | Gilson et al. | 106/30 B |
| 3,653,932 | 4/1972 | Berry et al. | 106/22 |
| 3,715,219 | 2/1973 | Kurz et al. | 106/309 |
| 3,846,141 | 11/1974 | Ostergren et al. | 106/22 |
| 3,994,736 | 11/1976 | Hertz et al. | 106/22 |
| 4,005,237 | 1/1977 | Panken | 428/195 |
| 4,038,297 | 7/1977 | Rodenberg et al. | 106/27 |
| 4,066,585 | 1/1978 | Schepp | 346/140 R |
| 4,069,179 | 1/1978 | Jones | 106/22 |
| 4,108,671 | 8/1978 | Richlin | 106/22 |
| 4,136,076 | 1/1979 | Daniels | 106/22 B |

(List continued on next page.)

FOREIGN PATENT DOCUMENTS

| | | | |
|---|---|---|---|
| 83303839 | 7/1983 | European Pat. Off. | |
| 0097823 | 1/1984 | European Pat. Off. | |
| 147257A | 7/1985 | European Pat. Off. | |
| 2101864 | 7/1972 | Fed. Rep. of Germany | |
| 2441478 | 3/1975 | Fed. Rep. of Germany | |
| 2753816 | 6/1978 | Fed. Rep. of Germany | |
| 2183873 | 5/1973 | France | |
| 31-113472 | 9/1956 | Japan | |
| 49-80708 | 7/1974 | Japan | |
| 54-21762 | 8/1979 | Japan | |
| 55-54368 | 4/1980 | Japan | 346/140 |
| 55-468 | 1/1981 | Japan | |
| 129274 | 1/1981 | Japan | |
| 113462 | 9/1981 | Japan | |
| 23665 | 2/1982 | Japan | |
| 166274 | 2/1982 | Japan | |
| 58-108271 | 6/1983 | Japan | |
| 61-83268 | 4/1986 | Japan | |
| 4327599 | 11/1992 | Japan | |
| 4337599 | 11/1992 | Japan | |
| 1424722 | 2/1976 | United Kingdom | |

OTHER PUBLICATIONS

Printing Ink, edited by Manjiro Shirato, published by Printing Association Publishing House, Jul. 1957.

(List continued on next page.)

*Primary Examiner*—Helene Klemanski
*Attorney, Agent, or Firm*—Spensley Horn Jubas & Lubitz

[57] ABSTRACT

A novel hot melt ink jet ink is disclosed for use in an impulse ink jet apparatus. The disclosed ink comprises a dispersed solid pigment which is formulated in a wax, or high molecular weight fatty acid or alcohol vehicle to form a hot melt ink which is solid at room temperature. The provision of such a pigment containing ink provides a high quality ink which is stable for long periods of time at relatively high temperatures. In the preferred embodiments, a dispersed graphite in a non-evaporative oil carrier, such as mineral oil, is formulated with candelilla wax, stearic acid and/or behenic acid.

40 Claims, No Drawings

U.S. PATENT DOCUMENTS

| | | | |
|---|---|---|---|
| 4,150,997 | 4/1979 | Hayes | 106/20 R |
| 4,153,467 | 5/1979 | Yano et al. | 106/20 |
| 4,165,399 | 8/1979 | Germonprez | 427/264 |
| 4,176,361 | 12/1979 | Kawada et al. | 346/1.1 |
| 4,197,135 | 4/1980 | Bailey | 106/22 R |
| 4,238,807 | 12/1980 | Bovio et al. | 346/140 |
| 4,243,994 | 1/1981 | Kobayashi et al. | 346/140 |
| 4,248,746 | 2/1981 | Greiner | 260/23 |
| 4,250,512 | 2/1981 | Kattner et al. | 346/140 |
| 4,273,847 | 6/1981 | Lennon et al. | 430/106 |
| 4,279,653 | 7/1981 | Makashima et al. | 106/22 R |
| 4,280,939 | 7/1981 | Johnson | 106/23 |
| 4,281,329 | 7/1981 | Yano et al. | 346/1.1 |
| 4,312,009 | 1/1982 | Lange | 346/140 |
| 4,332,946 | 6/1982 | Uehara | 106/20 R |
| 4,337,183 | 6/1982 | Santiago | 524/446 |
| 4,343,653 | 8/1982 | Beach | 106/22 R |
| 4,353,078 | 10/1982 | Lee et al. | 346/140 |
| 4,361,843 | 11/1982 | Cooke et al. | 346/1.1 |
| 4,386,961 | 6/1983 | Lin | 106/22 R |
| 4,390,369 | 6/1983 | Merritt et al. | 106/31 |
| 4,395,287 | 7/1983 | Kobayashi et al. | 106/20 |
| 4,396,429 | 8/1983 | Matsumoto et al. | 106/20 |
| 4,400,215 | 8/1983 | Cooke | 106/20 |
| 4,409,040 | 10/1983 | Tabayashi et al. | 106/20 |
| 4,421,559 | 12/1983 | Owatari | 106/20 |
| 4,426,227 | 1/1984 | Keeling et al. | 106/27 |
| 4,443,820 | 4/1984 | Mutoh et al. | 358/296 |
| 4,475,113 | 10/1984 | Lee et al. | 346/1.1 |
| 4,484,948 | 11/1984 | Merritt et al. | 106/31 |
| 4,490,731 | 12/1984 | Vaught | 106/22 R |
| 4,531,976 | 7/1985 | Lin | 106/27 R |
| 4,537,631 | 8/1985 | Cooke | 346/1.1 |
| 4,659,383 | 4/1987 | Lin et al. | 106/27 |
| 4,684,956 | 9/1987 | Ball | 106/22 |

OTHER PUBLICATIONS

Decision of Patent Opposition in Japan, Mar. 23, 1992, re JP app. No. 60-246426 w/translation.

Decision of Final Rejection, Mar. 23, 1992, re JP app. No. 60-246426 w/translation.

Rebuttal Brief, Dec. 20, 1991, re JP app. No. 60-246426 w/translation.

Chemical Abstract, No. 95; 229337Z, vol. 95, p. 643 (1981).

Abstract 702458/39 "Ink for Hot Ink Jet Recording Process–Contains Recording Component Decomposing at Temp. Well About b.pt. of Solvent or Dispersion Medium" (1986).

Abstract No. 169865-EG "Hot Melt Electrostatic Printing Ink" (1984).

Abstract No. 217965-EG "Electrostatic Printing Ink Composition" (1986).

Abstract No. J55145-774 "Low Softening Point Ink for Ink-Jet Recording Contains Water Soluble Dye, Polyhydric, Alcohol & Aliphatic Monohydric Alcohol", 1980.

Abstract No. 800333 "Recording Medium for Ink Jet Recording Process Comprises Colourant, Solvent and a Substance the Liberates a Vapour When Heated" (1986).

Noice of Opposition/Grounds for Opposition filed in European Pat. No. 0 181 198, 1993.

Abstract No. 35067C/20 "Ink Jet Recording Head–With Heating Element At Junction of Liquid Inlet and Inclined Expulsion Zone" (1986).

Abstract No. J3503 C/39, "Ink Jet Printer with Uniform Droplets–Uses Resistance Heating Elements to Control Generation of Ink Jet Droplets" (1986).

Abstract No. K5010 C/44 "High Speed Recording Equipment Drop Generator-has Heating Element Producing Bubbles Near End of Fine Tube" (1986).

Abstract No. 16528 C/49 "Print Head for Ink Jet Printer–With Dishcarge Orifice Has Inbuilt Electro-Thermal Heating Space" (1986).

Abstract No. 89298X/48 "Ink Compsns for Ink Injection Type Recording Appts, Prepared by Dissolving or Dispersing Oil Soluble Dye Dissolved in Liquid Fatty Acid in Aromatic Hydrocarbon Opt. cont.g. Nonionic Surfactant." (1986).

(List continued on next page.)

OTHER PUBLICATIONS

Abstract of Jap. Serial No. 77/17,758 "Magnetic Ink Jet Printing Process", 1977.
Abstract No. 107587 "Inks for Ink Jet Recording", 1986.
Abstract No. 06955B/04 "Oily Ink compsn. for Stamping, Recording, Jet Printing etc.–Can be Used on Plastic, Glass, Metal, Wood, etc. is not Sticky and Has Good Water Resistance." (1986).
Abstract No. 43987C/27 "Non–impact Recording Process–by Forming Images or Recording Substrate Using Water or Oil Based Ink Applying Toner to Images and Fixing Toner." (1986).
Abstract No. 45784 C/26 "Quick Drying Ink for Ink Jet Recording–Contains Oil–Soluble Dyes, Alcohol–amine(s) and Plyvalent Alcohol Derives." (1986).
Abstract No. 47097C/27 "Quick Drying Ink for Ink Jet Recording–Comprises Oil Soluble Dye, Alcohol Amine and Volatile Polar Solvent." (1986).
Abstract Only, Appln. No. 132548 filed Nov. 28, 1973.
Abstract of Jap. Appln. No. 132,548 "Ink Compositions for Ink Injection Type Recording Apparatus." (1981).
Abstract No. 95:229337z "Preparation of Hectographic Plates" *74–Radiation Chem. Photochem.,* vol. 95, p. 643 (1981).
Japanese Abstract No. 56–113462(A), 1981.
Japanese Abstract No. J56166–274, 1981.
*Industrial Waxes,* H. Bennett, vols. 1 and 2, Chemical Publishing Co., Inc. New York, N.Y. (1975).
Owens, "New Ink–Writing Methods for Graphic Recording" Instruments & Control Systems, vol. 38, pp. 100–102, Jul. 1965.
Hendricks, "Ink Splitter for Hot Melt Ink," IBM Technical Disclosure, no date available.
Bulletin, vol. 28, No. 3A, pp. 947–948, Aug., 1983.
Opposition Brief, dated Jul. 26, 1990, re Japanese Appln. No. 60–246426 with translation.
Refutation Brief, dated Jul. 16, 1991, re Japanese Appln. No. 60–246426 with translation.
Sweet, Richard G., "High Frequency Oscillography With Electrostatic Deflected Ink Jets", Stanform Electronics, Ltd., Technical Report No. 1722–1, Mar., 1964.

HOT MELT IMPULSE INK JET INK WITH DISPERSED SOLID PIGMENT IN A HOT MELT VEHICLE

CROSS REFERENCE TO RELATED APPLICATION

This is a file wrapper continuation of application Ser. No. 07/902,570 filed on Jun. 22, 1992, now abandoned which is a file wrapper continuation of application Ser. No. 07/817,948 filed on Jan. 3, 1992, now abandoned which is a file wrapper continuation of application Ser. No. 07/519,279, filed on May 4, 1990, now abandoned which is a divisional of application Ser. No. 07/146,211 filed on Jan. 20, 1988, now abandoned which is a continuation of application Ser. No. 07/006,727 filed on Jan. 23, 1987, now abandoned which is a continuation of application Ser. No. 06/668,095 filed on Nov. 5, 1984, now abandoned.

The present application is related to application Ser. No. 610,627, filed May 16, 1984, entitled "A Demand Ink Jet Utilizing a Phase Change Ink and Method of Operating", which is assigned to the assignee of the present application, and which is hereby incorporated by reference.

The present application is also related to application Ser. No. 394,153, filed Jul. 1, 1982, entitled "Stearic Acid Containing Ink Jet Inks", now abandoned, and its continuation application Ser. No. 565,124, filed Dec. 23, 1983 (Attorney Docket IJ-32-1), each of which applications is assigned to the assignee of the present application, and each of which is hereby incorporated by reference.

The present application is further related to application Ser. No. 331,604, filed Dec. 17, 1981, entitled "Natural Wax-Containing Ink Jet Inks", now U.S. Pat. No. 4,390,369, which is assigned to the assignee of the present application, and is hereby incorporated by reference.

The present application is also related to pending U.S. patent application Ser. No. 644,542, filed Aug. 27, 1984 entitled "High Molecular Weight, Hot Melt Impulse Ink Jet Ink", which application is hereby incorporated by reference.

BACKGROUND OF THE INVENTION

The present invention relates to the field of hot melt ink jet inks for use with impulse ink jet (drop on demand) type printers. More particularly, the present application relates to such ink jet inks which utilize solid pigments rather than soluble dyes as their colorants.

Originally, printing with hot melt type ink was suggested in connection with electrostatic printing apparatuses. In U.S. Pat. No. 3,653,932 (Berry et al), entitled "Electrostatic Printing Composition Comprising Didodecyl Sebacate", an electrostatic printing process is disclosed using an ink comprised of one or more specified di-esters. In the Berry process, ink is heated into a fluid phase and is caused to form a convex meniscus at the nozzle tip by hydrostatic pressure. This pressure causes the end of the ink to intrude into an electrostatic field. Ink is then electrostatically drawn into a single file stream of droplets which traverses the span between the tip of the nozzle and the carrier. The preferred inks for use in this process are di-esters of sebacic acid which have been esterified with alcohols of paraffins having 12 or less carbon atoms in their chains. Each of the preferred inks is disclosed as having a melting point "which does not exceed about 51° C. and a freezing point which is not below 30° C., to ensure that the ink will be in a liquid phase at the operating temperature at the exemplary reservoir, namely, about 56°±3° C., and that it "will be solid at generally encountered room temperatures to minimize its flow from the carrier. Berry et al discloses that such di-esters "provide excellent vehicles for pigments and dyes for producing high quality electrostatic printing", and further discloses a number of examples using methyl violet toner, C.I. solvent yellow, C.I. solvent black. The methyl violet toner of the examples comprises about 40% methyl violet tanate in a transparent yellow mineral oil carrier.

U.S. Pat. No. 3,715,219 (Kurz et al) discloses a similar electrostatic printing process using an ink composition comprising about 3% of a dye such as C.I. solvent black or C.I. solvent yellow. The remainder of the Kurz et al ink is a vehicle comprised of at least one alcohol of the paraffin series which has the general formulas $CH_3(CH_2)_nCH_2OH$, in which n is an integer between 12 and 26. According to Kurz, the preferred hot melt type inks have melting points which do not exceed about 61° C. and freezing points which are not below about 30° C. During the process, ink in a fluid phase is supplied at a constant flow rate from a source represented by supply tube 10 to reservoir 11 which terminates at a nozzle 12 with a capillary bore. The chamber 11 of the exemplary apparatus is maintained at a temperature in the range of about 62° C. and 82° C. during the disclosed process. Viscosity of the disclosed inks is said to be within a range having an upper limit of 50 centipoises at operating temperatures, the exemplary inks in the Kurz et al references having viscosities of between 4.0–5.9 at 80° C.

More recently, impulse ink jet printing processes using hot melt inks have been disclosed. Impulse ink jet printing differs from electrostatic printing in that individual droplets are discharged from a printing head in response to relatively low pressures which are typically achieved using piezoelectric head elements. Unlike electrostatic printing processes, such drop on demand processes produce much larger droplets which decelerate, not accelerate as they move toward the carrier.

One recent hot melt impulse ink jet ink is disclosed in U.S. Pat. No. 4,390,369 (Merritt et al), entitled "Natural Wax-Containing Ink Jet Inks". This patent discloses the use of a number of natural waxes, such as Japan wax, candelilla wax, carnauba wax, etc. These waxes may be used at percentages of from 0.5 to 97.0% by weight either as the basic fluid vehicle of the ink or as an additive to other fluidic vehicles such as fatty acids, more particularly oleic acid or oleic acid with benzyl ether. Merritt et al disclose a number of such inks having viscosities of 6.7 to 15.7 at 165° F. (about 74° C.). Merritt et al disclose that a "coloring agent or a dye such as an oil or solvent soluble dye is usually added to the composition for visability". The disclosed colorants include HD Victoria Blue, Calco nigrosine base, Acetosol Yellow, RLSN, and oil black BN.

In related application Ser. No. 391,153, filed Jul. 1, 1982 (Lin et al) a number of hot melt impulse ink jet inks are disclosed which are described as being solid or semi-solid at ambient temperature. The preferred ink is disclosed as comprising stearic acid in an approximate weight range of 50–99%. As explained in that application, commercially available stearic acids are produced from saponified and distilled animal fats usually being composed of 60% liquid and 40% solid acid, the bulk of the liquid acids being separated from the solid acids by hydraulic pressing to produce for example, single pressed, double-pressed, triple-pressed stearic acids, etc. According to the Handbook of Chemistry and Physics (49th Edition), chemically pure stearic acid is octadecanoic acid ($CH_3(CH_2)_{16}CO_2H$) (melting point 70.1° C.). In addition to stearic acid, the Lin et al application discloses that additives such as oleic acids, Typophor black, nigrosine base, benzyl ether, compounded or chemically modified waxes (including natural or other synthetic substances), a coloring agent or dye, such as oil or solvent soluble dye, etc. may be used to formulate the disclosed hot melt inks.

More recently, in the aforementioned related application entitled "High Molecular Weight, Hot Melt Impulse Ink Jet Ink", hot melt impulse ink jet inks have been disclosed comprising acid or alcohol vehicles in the $C_{20}$–$C_{24}$; range, significant proportions of a relatively high melting point ketone, such as stearone; a solid plasticizer, such as an acrylic resin; and a coloring agent, such as a dye. Alternatively, the disclosed vehicle may comprise waxes, such as candelilla wax and/or other specified waxes which melt above 65° C.

Numerous prior art references disclose a wide variety of colorants for use in other (non-impulse) printing or writing applications. For example, U.S. Pat. No. 4,238,807 (Bovio et al) discloses a non-impact printing device which selectively emits solid ink particles from a rod of solid ink which is pulsed with high voltages to cause ink particles to be eroded from the rod and ejected through a nozzle on the paper. The rod of said ink is disclosed as consisting of carbon black compressed with 5 to 20% of stearic acid as a binder. In U.S. Pat. No. 4,273,847 (Lennon et al) inks are disclosed for use in pulsed electrical printing. According to this process, ink particles, such as carbon particles are charged by conduction of current from other particles closer to a supporting sheet, detached by the electric field and then caused to transfer to the receiving paper by the force induced solely by the electrical field.

Other inks containing pigment, such as carbon black are known for other purposes. U.S. Pat. Nos. 3,421,910 (Gilson et al) and 3,330,673 (Voet et al) relate to a stencil paste and news printing inks, respectively, which use a dispersion of carbon black in mineral oil. U.S. Pat. Nos. 4,337,183 (Santiago), 4,248,746 (Greiner) and 3,353,874 (Trimble) each disclose ink for purposes other than jet printers which use a carbon pigment in a vehicle. Patents including disclosures of glycerol, ethylene glycol, diethylene glycol and the like, with colorant materials such as pigments or dyes (most of which inks are water based) are disclosed in U.S. Pat. Nos. 3,421,910 (Gilson); 3,846,141 (Ostergren et al); 4,396,429 (Matsumoto et al); 4,395,287 (Kobayashi et al); 4,409,040 (Tobayashi et al); 4,421,559 (Owatari) and 4,176,361 (Kawada et al). U.S. Pat. No. 4,443,820 discloses an ink which is solid at room temperature and liquid at an elevated temperature which contains more than then percent of a dye dispensed in a hydrocarbon of the thermally dissoluble type. The ink is deposited on a (hectographic) master by discharging from a jet generating unit. The deposited ink is cooled hence forming an image configuration of solidified ink suitable for use in hectographic printing of a number of reproductions of an original image. The ink in its liquid form has a viscosity of 3 to 20 c.p.

Notwithstanding the above-mentioned disclosures, a need exists to provide improved impulse ink jet inks which are capable of producing copy which approaches or exceeds the copy of standard impact-type printing, such as that which may be produced from a standard office typewritter or daisy-wheel printer. Such an ink should be readily jettable, easily stored and shipped for extended periods of time without separation or degradation yet be capable of providing a sharp, dark, well defined copy when placed into use.

SUMMARY OF THE INVENTION

The present invention provides a novel, hot melt ink jet ink containing a solid pigment dispersed in a vehicle comprising a $C_{18}$–$C_{24}$ acid or alcohol; or a wax having a melting point above 65° C. The preferred ink is solid at room temperature, but has a jettable viscosity when heated to temperature above the melting point of the vehicle, preferably above 80° C. The preferred ink further comprises an oil carrier in which the solid pigment is originally dispersed, which carrier is compatible with the acid, alcohol or wax vehicle. Unlike lower molecule weight vehicles, such as oleic acid vehicles, the graphite pigment will not settle out or separate even after extended time in the liquid state.

Accordingly, a non-evaporative ink system is provided for ink jet printing which is light fact, exhibits excellent archival properties, little or no corrosion, good edge definition, good thermal stability, and good dot size. The subject inks exhibit little or no lateral spread when the drop hits the paper, provides potential for laminatible prints, and offers the possibility of providing bright colors, true process color printing and OCR readable copy.

The preferred ink of the present invention utilizes a pre-disposed suspension of colloidal graphite having particle sizes of less than one micron, which are easily jetted through a 50 to 75 micron ink jet nozzles. Although the graphite particles would tend to settle out of inks having liquid vehicles, the high molecular weight, compatible nature of the disclosed inks prevents such separation even during extended operation at jetting temperatures.

Accordingly, a primary object of the present invention is the provision of a non-evaporative pigmented impulse ink jet ink.

A further object of the present invention is the provision of an impulse ink jet ink exhibiting superior light fastness, archival properties, edge definition, thermal stability and dot size.

Another further object of the present invention is a provision of a hot melt impulse ink jet ink exhibiting little or no corrision, and low toxicity.

Another aim of the present invention is the provision of bright colored inks, inks suitable for true process color printing and inks which are OCR readable.

These and other objects of the present invention will become apparent from the following more detailed description.

DESCRIPTION OF THE PREFERRED EMBODIMENTS

The present invention provides a novel hot melt ink jet ink composition for use in an impulse ink jet apparatus comprising a solid pigment dispersed in a vehicle comprising a $C_{18}$–$C_{24}$ acid or alcohol, or even more preferably, wax having a melting point above 65° C. As used herein, the term "pigment" refers to visible materials which are not soluble, but are suspended or dispersed as fine particles in the subject ink. The preferred solid pigment is a colloidal graphite having a particle size less than 25, preferably less than 10, more preferably less than one micron, which is carried in a non-evaporative oil carrier, such as mineral oil. Graphite is particularly preferred as a pigment when black is the desired color, however, other known pigments such as carbon black and barium lithol, are suitable for use in the present invention provided they meet aforementioned particle size requirements and do not unacceptably agglomerate or settle from the subject ink.

As mentioned above, one preferred vehicle is a $C_{18}$–$C_{24}$ fatty acid vehicle, or alcohol, acids being preferred over alcohols. Stearic acid or behenic acids are two such suitable acids, behenic presently being preferred over stearic. The preferred embodiment vehicle is a wax, particularly candelilla wax, having a melting point above 65° C. Other waxes believed suitable include bamboo leaf, certain bees waxes, caranda, carnauba, hydrogenated castor oil, Chinese insect, cotton, cranberry, certain Douglas-fir bark, asparto, certain flax, Indian corn, Madagascar, most microcrystalline waxes, montan, ouricury, ozocerite, palm, peat wax, rice bran, shellac wax, sisal hemp, sorghum grain, Spanish moss, refined sugar cane waxes and mixtures thereof, each of which waxes has a melting temperature above about 65° C. Mixtures of such waxes found suitable for jetting include a 50—50 mixture of candelilla and carbauba (97% wax, 3% dag).

In the preferred embodiment the solid pigment should comprise 0.1–10 wt %, preferably 1–5 wt %, more preferably 2–3 wt % of the ink. The herein disclosed vehicle of the subject ink should comprise 50–99.1, preferably 90–99 wt %, more preferably 95–98 wt % of the subject ink. The subject ink jet ink should have a maximum viscosity of about 15 centipoises, preferably less than about 14 centipoises, when discharged from an impulse ink jet apparatus at elevated temperatures, preferably above about 80° C.

In addition to the above-described components, the ink of the present invention may comprise additional additives, including ketones, such as stearone or laurone, which ketones should not exceed 50 wt % of said ink. The disclosed inks may optionally also contain up to 4 wt % of a plasticizer, such as an acrylic resin plasticizer. For a further description of such additives, please refer to the aforementioned related application entitled "High Molecular Weight, Hot Melt Impulse Ink Jet Ink", which has been incorporated by reference herein.

In addition to providing a novel ink, the present invention provides a novel method of hot melt impulse ink jet printing comprising the steps of (a) providing a hot melt impulse ink jet ink comprising at least a solid pigment dispersed in a vehicle comprising $C_{18}$–$C_{24}$ fatty acids or alcohols; or wax(es) having melting point(s) above 65° C.; (b) heating said impulse ink jet ink to a temperature above 65° C., preferably above 80° C. to obtain a composition having a viscosity below about 15 centipoises, and (c) impulse jetting said ink jet composition at said elevated temperature against a substrate whereby said composition solidifies to form hot melt print.

The use of solid pigment, such as colloidal dispersed graphite overcomes many of the difficulties which are encountered in using dyes in such inks. At high temperatures, such as the temperatures preferred for jetting hot melt inks, dyes are not as stable as pigments, not as strong in color, nor as permanent. The chief advantage of dyes are that they are soluble in most ink formulations and will not settle or separate during the storage shipment or use of such inks.

Applicants have recognized that when high molecular weight, relatively high melting point vehicles, such as $C_{18}$–$C_{24}$ fatty acids or waxes are utilized, colloidal graphite will be frozen in suspension during non-operating periods. Furthermore, it has been found that, even when heated, high melting point materials, such as candelilla wax, maintain the suspension of such graphite particles for much longer times than corresponding liquid inks, such as oleic acid based inks. Furthermore, thermal stability and other advantages of such pigments would be highly advantageous, even if agitation were to be used to maintain their colloidal suspension over extended periods of time.

The present invention may further be understood from the following examples:

EXAMPLE 1

Oil Dag (dispersed Acheson graphite) in mineral oil was diluted to approximately 2% solids (graphite) with oleic acid, with a resultant viscosity of about 60 cps at 20° C. and 13 cps at 57° C. This ink comprised 95 wt % oleic acid, 3 wt % mineral oil and 2 wt % graphite. This solution was jetted using a standard liquid impulse ink jet system, available from Exxon Office Systems under the tradename "Archer Imaging Subsystem". Character printing was conducted yielding high quality, highly defined dots and characters. The system was operated for at least 4 hours, allowed to stand overnight, and refired acceptably the next day. No adverse effect of particulate matter influencing the performance was noticed, however the subject pigment had tended to settle, and, over two days the subject ink gradually lost its color and became colorless. This ink would be unsuitable for use in impulse ink jet printing because, during storage, shipment and/or normal use the dispersed graphite would settle to the point where its resuspension for jetting would not be practical.

EXAMPLE 2

An impulse ink jet ink was prepared comprising 95 wt % candelilla wax and 5 wt % oil dag, again to provide an ink having about 2 wt % colloidal graphite, and 3 wt % mineral oil. The resulting ink was found to have excellent jettability at an operating reservoir temperature of between 90°–120° C., using the printer described in related patent application, Ser. No. 610,627, filed May 16, 1984, (IJ-27-2). Its viscosity at 110° C. was about 10 cps. The subject ink produced very good print quality, both initially, and after 199 hours of standing at operating temperature in the liquid state. It is believed that these results stem in part from the excellent compatibility between the subject vehicle and the colloidal graphite in the subject composition, and also possibly the effects of convective currents within the subject ink at the 90° C.+operating temperatures of the subject test.

EXAMPLE 3

An impulse ink jet ink was prepared comprising 95 wt % stearic acid, 2 wt % colloidal graphite, and 3 wt % mineral oil. The resulting ink had a viscosity at 80° C. of 10 cps. Stearic acid represents one of the lower molecular weight acids suitable for use as the vehicle for the herein disclosed inks, and is presently not as preferred as such higher molecular weight acids as behenic. Nonetheless, this stearic acid ink was found to exhibit suitable jettability and good print quality initially, and over a period of 16 hours (overnight) while left standing at operating temperatures of 90° C. While such a standing time is presently not believed to be acceptable for most commercial applications, the use of such a pigmented hot-melt impulse ink jet ink on a commercial basis may nonetheless be facilitated if incorporated with other known techniques for improving the stability of dispersions, including for example, the use of emulsifiers. It is further anticipated that the use of proportions of stearic acid with high melting point ketones, such as stearone or laurone, or with additions the aforementioned waxes or higher molecular weight fatty acids or alcohols might further improve the long term stability of such inks.

In view of the above, it is anticipated that materials such as the aforementioned fatty acids or alcohols of relatively high molecular weight and the aforementioned waxes which melt above 65° C. are particularly suitable vehicles for use in formulating inks of the present invention.

We claim:

1. A hot melt solid ink for supply to an ink jet apparatus which heats the solid ink to an elevated jetting temperature and supplies it as liquid ink to an impulse ink jet of a small nozzle diameter, said hot melt solid ink comprising:
    a vehicle selected from the group consisting of (i) a wax having a melting temperature above 65° C. and (ii) a $C_{18}$–$C_{24}$ fatty acid or alcohol;
    solid pigment as a recording means in an amount of no more than 10 percent of the total weight of said ink and having a particle size sufficiently small so as not to clog the nozzle and so as to minimize the terminal settling velocity of the solid pigment;
    a non-evaporative carrier in which the solid pigment is suspended, the carrier being dispersed through the vehicle and compatible with the vehicle to enable the carrier and pigment to remain dispersed within the vehicle for long periods even at the jetting temperature and to enable the more efficient use of a smaller amount of said solid pigment; and
    said hot melt ink having a jetting viscosity of no more than 15 cP at the jetting temperature.

2. The ink of claim 1 wherein the carrier is an oil carrier.

3. The ink of claim 1 wherein the carrier is mineral oil.

4. The ink of claim 1 wherein the solid pigment is colloidal graphite.

5. The ink of claim 1 wherein the nozzle diameter is 5–75 microns and the particle size of the solid pigment is less than 25 microns.

6. The ink of claim 1 wherein the elevated jetting temperature is above 65° C.

7. The ink of claim 1 wherein the elevated jetting temperature is above 80° C.

8. The ink of claim 1 wherein the elevated jetting temperature is above 80° C. and the jetting viscosity is no more than 14 cp.

9. The ink of claim 1 wherein the vehicle is candelilla wax.

10. The ink of claim 1 wherein the vehicle is stearic acid behenic acid, and their mixtures.

11. The ink of claim 1 wherein the ink includes a ketone having a melting point between 65°–120° C.

12. The ink of claim 11 wherein the ketone is stearone.

13. The ink of claim 1, wherein the solid pigment is barium lithol.

14. The ink of claim 1, wherein the solid pigment is carbon black.

15. The ink of claim 1, wherein the solid pigment comprises about 0.1–10 by weight percent of the ink.

16. The ink of claim 1, wherein the solid pigment comprises about 1–5 by weight percent of the ink.

17. The ink of claim 1, wherein the solid pigment comprises about 2–3 by weight percent of the ink.

18. The ink of claim 1, wherein the solid pigment comprises an average particle size of less than 10 microns.

19. The ink of claim 1, wherein the solid pigment comprises an average particle size of less than 1 micron.

20. The ink of claim 1, wherein the vehicle comprises about 50–99.1 by weight percent of the ink.

21. The ink of claim 1, wherein the vehicle comprises about 90–99 by weight percent of the ink.

22. The ink of claim 1, wherein the vehicle comprises about 95–98 by weight percent of the ink.

23. The ink of claim 1, wherein the ink further includes a plasticizer.

24. The ink of claim 11, wherein the ketone is laurone.

25. The ink of claim 11, wherein the ketone is less than 50 weight percent of the ink.

26. A method of operating an ink jet apparatus of a small nozzle diameter, comprising the steps of:
    (a) heating a hot melt solid ink comprising:
        a vehicle selected from the group consisting of:
            (i) a wax having a melting temperature above 65° C. and
            (ii) a $C_{18}$–$C_{24}$ fatty acid or alcohol, and
        a non-evaporative carrier in which a solid pigment, suspended in the carrier, in an amount of no more than 10 percent of the total weight of said ink and having a particle size much smaller than nozzle diameter so as not to clog the nozzle and sufficiently small so as to minimize the terminal settling velocity of the solid pigment, the carrier being dispersed through the vehicle and compatible with the vehicle and thus enables the more efficient use of a smaller amount of said pigment;
    (b) during a printing period discharging droplets of the liquid ink via an impulse ink jet into a nearby print substrate; and
    (c) during a standby period maintaining the liquid ink at the elevated temperature in readiness for the next printing period without the pigment settling out or separating from the vehicle.

27. The method of claim 26 wherein the carrier is an oil carrier.

28. The method of claim 26 wherein the carrier is mineral oil.

29. The method of claim 26 wherein the solid pigment is colloidal graphite.

30. The method of claim 26 wherein the nozzle diameter is 50–75 microns and the particle size of the pigment is less than 25 microns.

31. The method of claim 26 wherein the jetting temperature is above 65° C.

32. The method of claim 26 wherein the jetting temperature is above 80° C.

33. The method of claim 26 wherein the jetting temperature is above 80° C. and the jettable viscosity is no more than 14 cp.

34. The method of claim 26 wherein the solid pigment is 0.1–5% by weight of the ink.

35. The method of claim 26 wherein the vehicle is candelilla wax.

36. The method of claim 26 wherein the vehicle is selected from the group consisting of stearic acid, behenic acid, and their mixtures.

37. The method of claim 26 wherein the ink includes a ketone having a melting point between 65°–120° C.

38. The method of claim 37 wherein the ketone is stearone.

39. A hot melt solid ink for supplying to an ink jet apparatus which heats the solid ink to an elevated jetting temperature and supplies it as liquid ink to an impulse ink jet of a small nozzle diameter, said hot melt solid ink comprising:
- a vehicle selected from the group consisting of (i) a wax having a melting temperature above 65° C. and (ii) a $C_{18}$–$C_{24}$ fatty acid or alcohol;
- solid pigment as a recording means, having a particle size of no greater than 10 microns and in an amount of no more than 10 percent of the total weight of said ink;
- a non-evaporative carrier in which the solid pigment is suspended, and the carrier being dispersed through the vehicle and compatible with the vehicle to enable the carrier and pigment to remain dispersed within the vehicle for long periods even at the jetting temperature and to enable the more efficient use of a smaller amount of said solid pigment; and
- said hot melt ink having a jetting viscosity of no more than 15 cP at the jetting temperature not to exceed 110° C.

40. A method of operating an ink jet apparatus of a small nozzle diameter, comprising the steps of:
(a) heating a hot melt solid ink having a viscosity of no more than 15 cP at a jetting temperature of not to exceed 110° C., comprising:
- a vehicle selected from the group consisting of:
  (i) a wax having a melting temperature above 65° C. and
  (ii) a $C_{18}$–$C_{24}$ fatty acid or alcohol, and
- a non-evaporative carrier,
- a solid pigment, suspended in the carrier, of a particle size of no greater than 10 microns and in an amount of no more than 10 percent of the total weight of said ink, the carrier being dispersed through the vehicle and compatible with the vehicle and thus enables the more efficient use of a smaller amount of said solid pigment;

(b) during a printing period discharging droplets of the liquid ink via an impulse ink jet onto a nearby print substrate; and (c) during a standby period maintaining the liquid ink at the jetting temperature in readiness for the next printing period without the pigment settling out or separating from the vehicle.

* * * * *